United States Patent [19]

Lorson

[11] Patent Number: 4,543,989
[45] Date of Patent: Oct. 1, 1985

[54] DISCHARGE VALVE ASSEMBLY FOR REFRIGERATION COMPRESSORS

[75] Inventor: E. William Lorson, Fairborn, Ohio

[73] Assignee: Copeland Corporation, Sidney, Ohio

[21] Appl. No.: 578,989

[22] Filed: Feb. 13, 1984

Related U.S. Application Data

[63] Continuation of Ser. No. 318,155, Nov. 4, 1981, abandoned.

[51] Int. Cl.[4] .............................................. F16K 15/02
[52] U.S. Cl. ................................ 137/543.19; 251/356; 137/540
[58] Field of Search ................ 137/514.5, 533.19, 540, 137/543.19, 515.7, 543.17; 251/122, 333, 356

[56] References Cited

U.S. PATENT DOCUMENTS

| 310,459 | 1/1865 | Nicholson | 137/512.1 |
|---|---|---|---|
| 367,726 | 8/1887 | Penney | 417/454 |
| 512,369 | 1/1894 | Garis | 137/543.17 |
| 520,349 | 5/1894 | Zies | 137/512.2 |
| 542,083 | 7/1895 | De Laval | 137/512.1 |
| 704,557 | 7/1902 | Michener | 137/514.5 |
| 955,822 | 4/1910 | Mayhew | 417/447 |
| 976,010 | 11/1910 | Thompson | 137/512.1 |
| 1,109,154 | 9/1914 | Thomas | 137/512.2 |
| 1,136,840 | 4/1915 | Shaw | 137/514.5 |
| 1,185,412 | 5/1916 | Kramer | 417/268 |
| 1,287,751 | 12/1918 | Richards | 137/512.1 |
| 1,407,518 | 2/1922 | Dennedy | 137/512 |
| 1,425,663 | 8/1922 | Lawhead | 417/567 |
| 1,467,445 | 9/1923 | Meyers | 137/454.4 |
| 1,476,794 | 12/1923 | Berry | 137/512.3 |
| 1,490,141 | 4/1924 | Stoms | 137/512.1 |
| 1,494,834 | 5/1924 | Hack | 137/454.4 |
| 1,514,233 | 11/1924 | Searles et al. | 123/188 S |
| 1,628,096 | 5/1927 | Worth | 417/567 |
| 1,652,978 | 12/1927 | Enock | 137/512.1 |
| 1,659,817 | 2/1928 | Halvorsen | 137/512 |
| 1,719,572 | 7/1929 | Stoll | 137/512.3 |
| 1,800,185 | 4/1931 | Thrush | 137/543.17 |
| 1,871,285 | 8/1932 | Tursky | 137/543.21 |
| 1,976,098 | 10/1934 | Smith | 417/566 |
| 1,985,841 | 12/1934 | Shepherd | 137/512.1 |

(List continued on next page.)

FOREIGN PATENT DOCUMENTS

| 144437 | 4/1950 | Australia . |
|---|---|---|
| 681798 | 3/1964 | Canada . |
| 452903 | 11/1927 | Fed. Rep. of Germany . |
| 1080350 | 4/1960 | Fed. Rep. of Germany . |
| 1503428 | 4/1969 | Fed. Rep. of Germany . |
| 1550254 | 7/1969 | Fed. Rep. of Germany . |
| 2426378 | 1/1975 | Fed. Rep. of Germany . |
| 940160 | 12/1948 | France . |
| 2100429 | 3/1972 | France . |
| 2366465 | 4/1978 | France . |
| 679079 | 9/1952 | United Kingdom . |
| 697495 | 9/1953 | United Kingdom . |
| 905661 | 8/1956 | United Kingdom . |
| 988894 | 4/1965 | United Kingdom . |
| 995929 | 6/1965 | United Kingdom . |
| 1015412 | 12/1965 | United Kingdom . |
| 1090740 | 11/1967 | United Kingdom . |
| 1199523 | 7/1970 | United Kingdom . |
| 1265497 | 3/1972 | United Kingdom . |
| 1350287 | 4/1974 | United Kingdom . |
| 1374783 | 11/1974 | United Kingdom . |

OTHER PUBLICATIONS

Excerpt from "Machine Design", (U.S.), vol. 42, p. 146, Nov. 12, 1970.
"A Look at Problem-Solving with Custom-Made Vespel ® Parts made by Du Pont from High Performance Engineering Resins".

Primary Examiner—Alan Cohan
Assistant Examiner—John A. Rivell
Attorney, Agent, or Firm—Harness, Dickey & Pierce

[57] ABSTRACT

A discharge valve assembly is disclosed which includes an improved valve guide and spring retainer having a continuous annular surface surrounding the discharge valve and operative to guide movement thereof. An improved discharge valve is also disclosed which includes an arcuate lower peripheral surface portion defined by a surface of revolution of a curve which surface may form the surface of a zone of a sphere. The annular guide surface and improved discharge valve cooperate to the noise level emanating from the compressor valve assembly and to facilitate manufacture and assembly of the components thereof.

10 Claims, 5 Drawing Figures

U.S. PATENT DOCUMENTS

| | | | |
|---|---|---|---|
| 2,025,240 | 12/1935 | Higham | 137/454.4 |
| 2,193,243 | 3/1940 | Teeter | 417/569 |
| 2,349,137 | 5/1944 | Brown | 137/512.2 |
| 2,358,950 | 9/1944 | Trautman | 251/333 |
| 2,359,486 | 10/1944 | Magis | 137/454.4 |
| 2,366,004 | 12/1944 | Crittenden | 137/543.19 |
| 2,386,726 | 10/1945 | Tannehill | 137/540 |
| 2,579,667 | 12/1951 | Hanson | 137/512.2 |
| 2,593,522 | 4/1952 | Barnes | 137/514.5 |
| 2,900,999 | 8/1959 | Courtot | 137/516.25 |
| 2,930,401 | 3/1960 | Cowan | 137/543.21 |
| 2,949,929 | 8/1960 | Moore | 137/516.29 |
| 3,229,864 | 1/1966 | Roder | 417/566 |
| 3,332,437 | 7/1967 | Hallen | 137/516.29 |
| 3,419,041 | 12/1968 | Jennings | 137/533.19 |
| 3,536,094 | 10/1970 | Manley, Jr. | 251/333 |
| 3,548,868 | 12/1970 | Mullaney, III | 137/543.13 |
| 3,664,371 | 5/1972 | Schneider | 137/543.19 |
| 3,770,009 | 11/1973 | Miller | 137/543.19 |
| 3,777,779 | 12/1973 | Schwaller | 137/515.7 |
| 3,889,710 | 6/1975 | Brost | 137/512.15 |
| 4,329,125 | 5/1982 | Chambers | 137/543.17 |

DISCHARGE VALVE ASSEMBLY FOR REFRIGERATION COMPRESSORS

This application is a continuation of application Ser. No. 318,155 filed Nov. 4, 1981, now abandoned.

BACKGROUND AND SUMMARY OF THE INVENTION

The present invention relates generally to pressure responsive compressor valve assemblies and more particularly to such assemblies employing disc type valve members and particularly adapted for use on refrigeration compressors.

The present invention comprises a discharge valve assembly having an improved combination valve guide and spring retainer member which cooperates with and guides movement of an improved discharge valve. The discharge valve of the present invention is an improvement on the discharge valve disclosed in assignee's copending application Ser. No. 971,309, filed Dec. 20, 1978, now abandoned in favor of continuation application Ser. No. 219,849, filed Dec. 23, 1980 now U.S. Pat. No. 4,368,755. The combination valve guide and spring retainer is an improvement over that disclosed in assignee's copending application Ser. Nos. 234,343, now abandoned in favor of application Ser. No. 318,053, filed Nov. 4, 1981 and 234,169, both filed Feb. 13, 1981 and preferably incorporates the multi-leaf spring biasing means disclosed therein and represents an alternative to the spring guide and stop disclosed in assignee's copending application Ser. No. 114,345, filed Jan. 22, 1980. The valve guide and spring retainer may also incorporate the diffuser arrangement disclosed in assignee's copending application Ser. No. 318,055 entitled "Discharge Valve Assembly For Refrigeration Compressors" filed of even data herewith and along with the improved discharge valve disclosed herein is well suited for use with either the valve plate assembly disclosed in assignee's copending application Ser. No. 114,346, filed Jan. 22, 1980 or preferably the valve plate assembly disclosed in assignee's copending application Ser. No. 318,052 entitled "Valve Plate Assembly For Refrigeration Compressors" filed of even data herewith.

Valve plates and cylinder head assemblies can become relatively complex in configuration for certain valve arrangements and as a result may be quite costly to manufacture and sometimes to assemble.

The present invention provides an improved valve assembly which includes a modified discharge valve design and a modified valve guide spring support member. The discharge valve includes an arcuate or spherical shaped portion provided around the lower peripheral edge thereof which appears to provide significant improvement in the gas flow characteristics whereby a given flow volume may be discharged from the compression chamber with less opening movement or lift of the discharge valve. Not only does this design appear to provide improved flow characteristics and thus better performance efficiencies, but the reduced lift required operates to reduce the compressor valve assembly operating noise significantly. Additionally, the valve assembly of the present invention includes a valve guide and spring retainer having a continuous annular valve guide surface portion extending around the outer periphery of the discharge valve and operative to provide a continuous guiding surface for engagement by the discharge valve to maintain the valve in proper aligned position during cyclical opening and closing movement thereof. The continuous surface not only insures proper alignment is maintained but also avoids the possibility of discrete wear points occurring along the peripheral surface of the discharge valve and appears to contribute to the reduction in operating noise emanating from the valve assemblies. This improved valve guide also is more economical to manufacture, requiring less machining of surfaces than the multiple finger arrangement of prior designs.

Additional advantages and features of the present invention will become apparent from the subsequent description and the appended claims taken in conjunction with the accompanying drawings.

BRIEF DESCRIPTION OF THE DRAWINGS

FIG. 5 is a graphical illustration of flow area as a function of position along each of the two discharge valves shown in FIG. 4.

DESCRIPTION OF THE PREFERRED EMBODIMENT

Figure 1:
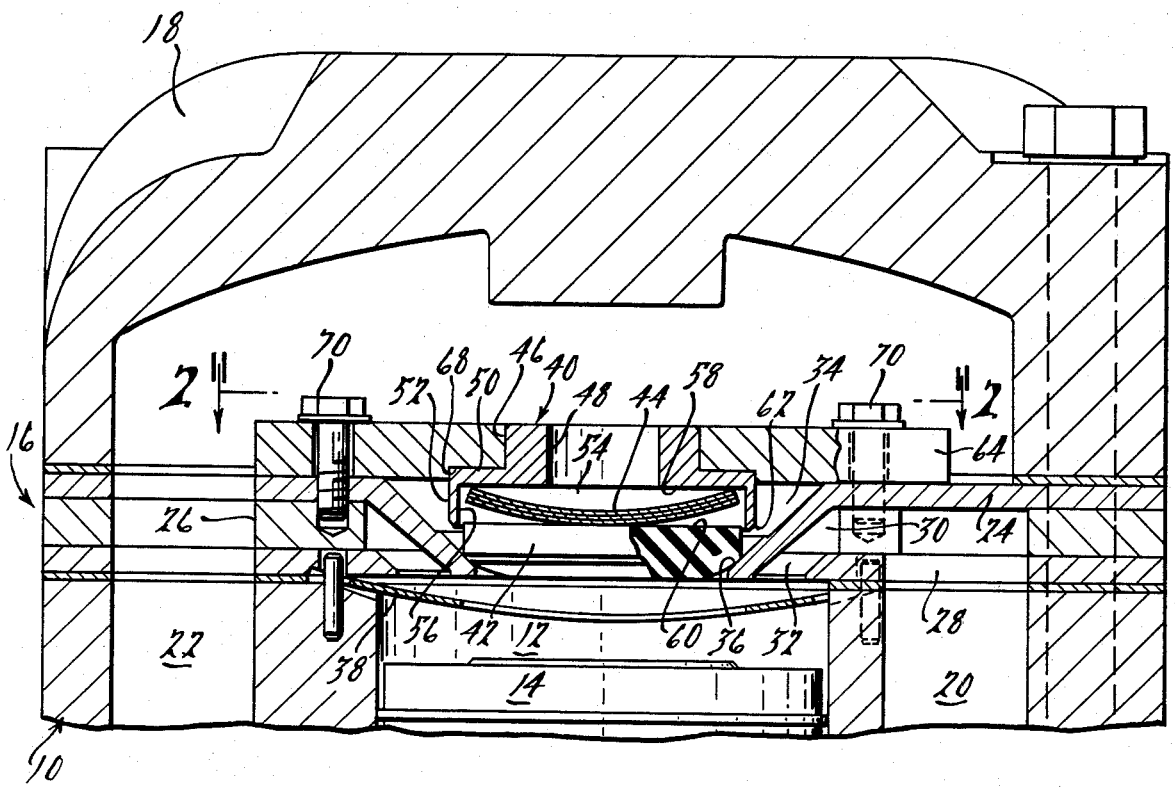
FIG. 1 is a fragmentary section view of a portion of a refrigeration compressor showing a valve assembly in accordance with the present invention installed in operative relationship to a cylinder of the compressor.
Figure 2:
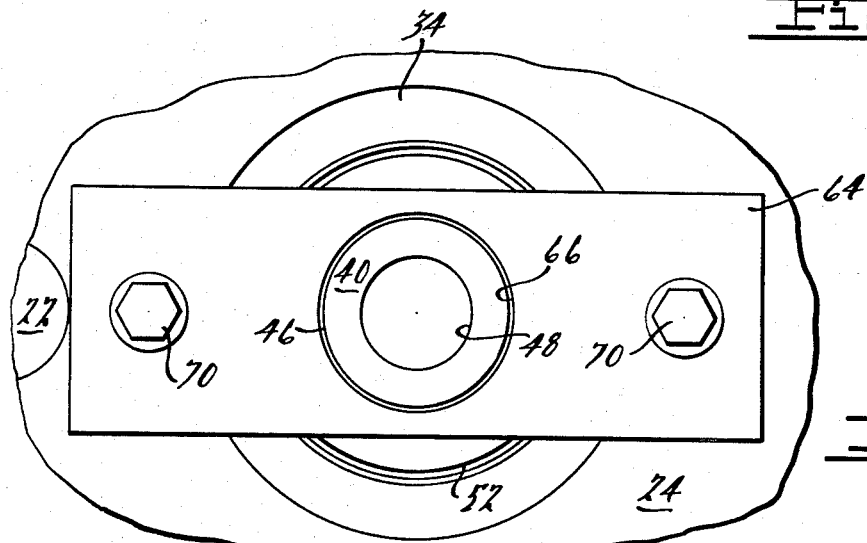
FIG. 2 is a plan view of the valve assembly of FIG. 1, the view being taken along line 2—2 thereof.

Referring now to FIG. 1, there is shown a compressor housing 10 having a compression chamber defined by cylinder 12 including a reciprocating piston 14 disposed therein with a valve assembly 16 in accordance with the present invention and head 18 secured in overlying relationship thereto. Compressor housing 10 includes both suction and discharge gas passages 20 and 22 for conducting fluid to and from the cylinder 12.

Valve assembly 16 includes a three piece valve plate assembly of the type disclosed in assignee's copending application Ser. No. 318,052, entitled "Valve Plate Assembly For Refrigeration Compressors" filed of even date herewith including upper, center, and lower valve plates 24, 26, and 28 respectively secured together by an oven brazing process and cooperating to define a suction gas chamber 30, a suction gas inlet passage 32, a discharge gas passage 34 and discharge valve seat 36. A ring type suction valve 38 (shown in an open position in FIG. 1) seats against the lower surface of the lower valve plate 28. The valve assembly also includes a discharge valve guide and spring retainer 40 and discharge valve 42 both in accordance with the present invention and leaf spring biasing means 44 of the type disclosed in assignee's copending application Ser. No. 234,343, positioned therebetween.

Discharge valve guide and spring retainer 40 includes a generally cylindrical upper portion 46 having a center bore 48 extending therethrough and an annular flange portion 50 extending radially outwardly from a lower end thereof. A second annular flange portion 52 projects axially downwardly (as shown) from the periphery of radial flange portion 50 so as to define a cylindrical cavity 54 into which discharge valve 42 is movable with inner sidewalls 56 thereof being selectively engageable with discharge valve 42 to guide such movement. Preferably, flange portion 52 will extend axially downwardly into discharge passage 34 a distance sufficient to slightly overlap the peripheral sidewall of discharge valve 42 when it is in a closed position as shown in FIG. 1. Multiple leaf spring 44 is positioned within the cavity 54 with peripheral portions thereof bearing against the inner surface 58 of the radial flange 50 and the center portion thereof bearing against the upper planar surface 60 of discharge valve 42 so as to bias it into a closed position. The lower peripheral outer edge portion 62 of axial flange 52 is also beveled slightly to improve the flow of discharge gas through the discharge gas passage 34.

An elongated generally rectangular shaped bridge member 64 is provided to support guide member 40 within the discharge gas passage 34 and includes a bore 66 into which cylindrical portion 46 is preferably press fitted or otherwise suitably secured. An enlarged diameter recessed portion 68 is also provided in the lower surface of bridge member 64 to partially receive radial flange portion 50 of guide member 40. Suitable bolts 70 are provided to secure bridge member 64 and the associated guide member 40 to the valve plate assembly 16 in substantially the same manner as described in assignee's aforementioned related application. It should be noted, however, that while as shown and described herein, bridge member 64 and valve guide and spring retainer 40 are separately fabricated they may alternatively be manufactured as a single one piece construction.

Figure 3:
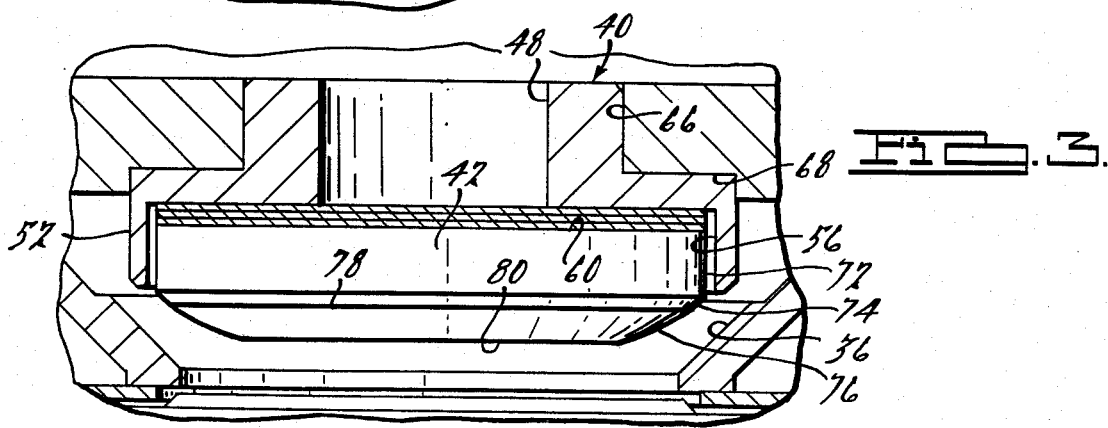
FIG. 3 is an enlarged fragmentary section view of the valve assembly of FIG. 1 showing the discharge valve in an open position and the associated valve guide.
Figure 3:
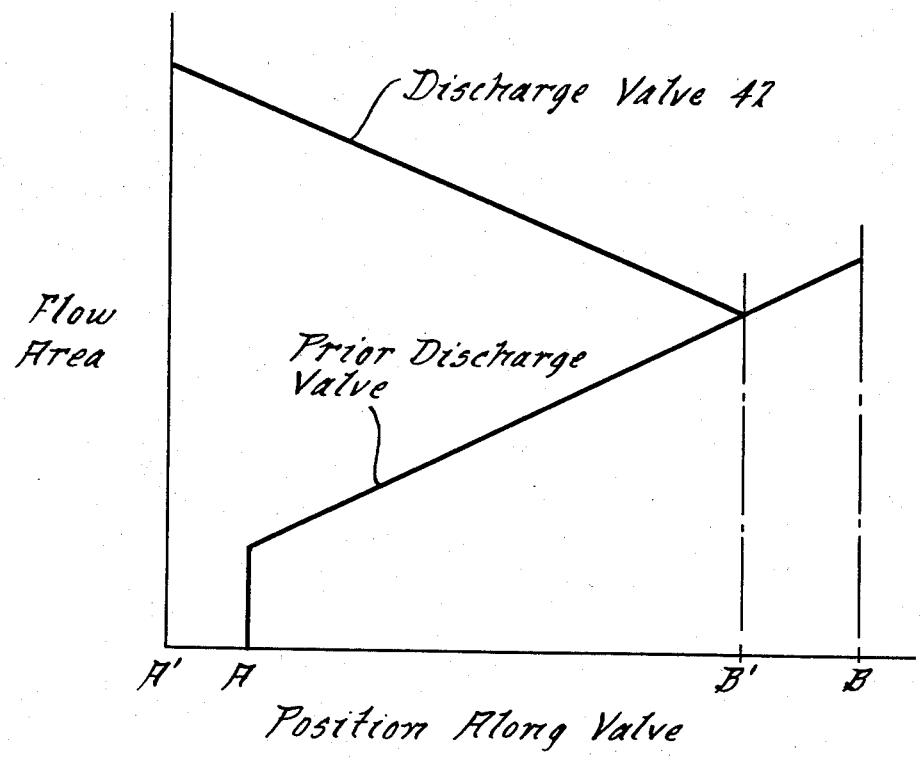

As best seen with reference to FIG. 3, discharge valve 42 has a generally cylindrical sidewall 72 extending from substantially planar upper surface 60 to a beveled edge portion 74 extending around the periphery thereof. Preferably this beveled edge portion will be disposed at an included angle of approximately 43° relative to a plane lying parallel to surface 60 thereof and is designed to sealingly seat against valve seat 36 which is positioned at an included angle of approximately 45° relative to the aforementioned plane. An arcuate or curved surface portion 76 extends from the lower edge 78 of the beveled portion 72 to the lower planar surface 80 of discharge valve 42. Preferably, arcuate portion 76 will define a surface of revolution of an arc and in some cases may define the surface area of a zone of a sphere having a center positioned along the axis of the discharge valve 42. It may in some cases be preferable to position or select arcuate portion 76 such that it is approximately tangent to the beveled surface 74 at the point of intersection 78 therewith so as to avoid possible disruption of gas flow thereacross. The height or axial dimension of arcuate portion 76 must be such as to position the lower planar surface 80 of discharge valve 42 in substantially coplanar relationship with the lower surface of the lower valve plate when discharge valve 42 is in a fully closed position. Preferably, discharge valve 42 will be fabricated from a suitable polymeric composition material such as Vespel as employed in the fabrication of the valves disclosed in the aforementioned application Ser. No. 219,849, although it may be necessary to increase the axial thickness thereof or to utilize a metal therefor due to the higher stresses encountered as a result of the increased surface area thereof which continuously is exposed to the cylinder 12.

Figure 4:
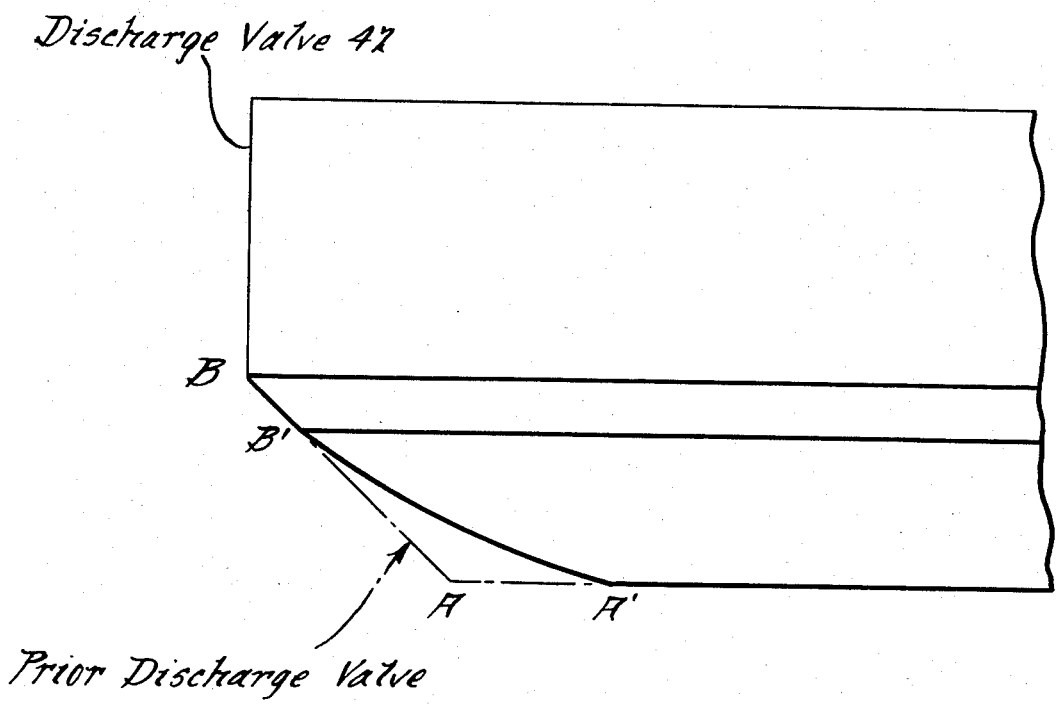
FIG. 4 is an enlarged fragmentary edge view of the discharge valve of the present invention shown in overlying relationship to the edge contour of a discharge valve of a prior design.

The distinctions and advantages afforded by the design of discharge valve 42 may be best seen and explained with reference to FIGS. 4 and 5. FIG. 4 shows an enlarged edge profile view of the discharge valve of the present invention (shown in full lines) overlayed on an edge profile of a discharge valve of the type disclosed in the aforementioned application Ser. No. 219,849 (shown partially in phantom for clarity) and FIG. 5 is a graphical representation of the flow area provided between the outer surfaces of the respective discharge valves and the valve seat portion 36 of valve plate assembly 16 at various points therealong indicated in FIG. 4.

As shown in FIG. 5, the prior discharge valve having a continuous conical sidewall provided no discharge flow area between points A and A' thereof because this area represented a portion of the lower planar surface of the discharge valve. The area between A and B' of the prior discharge valve provides a substantially linearly increasing flow area due to the increasing diameter of the concentric conical surfaces defining the flowpath. However, with the discharge valve of the present invention, the area between A' and B' is of an arcuate contour representing the surface of revolution of an arc and thus provides a significantly greater flow area over the entire range from A' to B' and which gradually decreases as the flow progress outwardly from B'. Because both the discharge valve of the present invention and that of the prior design have identical conical contours between B' and B, the flow area provided between these points is identical. Thus, as is dramatically and clearly illustrated in the graphical representation, the provision of an arcuate or spherical surface portion along the lower edge of the discharge valve operates to significantly increase the resulting flow area through which discharge gas may exit from the cylinder although the re-expansion volume of the cylinder is also increased slightly due to the space provided by the arcuate surface portion. Viewed another way, assuming a given volume of discharge gas must be passed through the area between the discharge valve and valve seat, the discharge valve must open or have a sufficient lift to provide the required flow area. Because the discharge valve of the present invention affords a significantly greater flow area for a given lift, the actual lift or opening movement of the valve may be substantially reduced and yet still allow the given volume of gas to be discharged. This reduced lift contributes to quieter valve operation and hence compressor operation.

While the subject discharge valve offers substantial advantages for some applications, it may not be ideally suited for all such applications. For example, the increase in re-expansion or clearance volume resulting from the arcuate surface portion may be significant in some applications such as low temperature compressors. Also, the arcuate surface portion renders the present discharge valve slightly more expensive to manufacture than the prior design and reduces the seating area of the valve. Thus while the subject discharge valve provides significant advantages, they are not obtained without compromise.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. An improved discharge valve assembly for a compressor having means defining a compression chamber, said discharge valve assembly overlying said chamber and comprising:

a valve plate assembly having a surface facing said chamber and means defining a conical discharge passage including a portion defining a discharge valve seat;

a discharge valve positioned within said discharge passage and movable between open and closed positions within said passage;

stop means overlying said discharge valve and operative to limit opening movement of said discharge valve whereby said discharge valve restricts flow through said discharge passage when in an open position, said discharge valve having a generally planar inner surface facing said chamber and positioned in substantially coplanar relationship with said valve plate surface when said discharge valve is in a closed position and including a conical peripheral surface portion generally complimentary in shape to and sealingly engageable with said valve seat to effectively close said discharge passage when said valve is in a closed position and an arcuate peripheral surface portion adjoining said conical portion and extending radially inwardly away from said valve seat to said inner surface, said arcuate surface portion being spaced from said valve seat when said valve is in a closed position, the locus of the centers of curvature of, said arcuate surface portion lying on a single circle whereby the restriction to flow through said discharge passage resulting from the limited opening movement of said discharge valve is reduced and the minimum flow area through said discharge passage when said valve member is in a fully open position is increased; and biasing means for biasing said conical peripheral surface portion into engagement with said valve seat.

2. An improved discharge valve assembly as set forth in claim 1 wherein said arcuate peripheral surface portion defines a surface of revolution of an arc.

3. An improved discharge valve assembly as set forth in claim 2 wherein said arc has a constant radius of curvature.

4. An improved discharge valve assembly as set forth in claim 1 wherein said arcuate peripheral surface is positioned between a compression chamber of said compressor and said conical peripheral surface portion.

5. An improved discharge valve assembly as set forth in claim 1 wherein said biasing means include a valve guide and spring retainer member secured to said valve plate assembly.

6. An improved discharge valve assembly as set forth in claim 5 wherein said valve guide and spring retainer includes an annular flange portion extending into said discharge passage and operates to guide opening and closing movement of said discharge valve.

7. An improved discharge valve assembly as set forth in claim 6 wherein said flange portion is positioned in overlapping relationship to the periphery of said discharge valve when said discharge valve is in a closed position.

8. An improved discharge valve assembly as set forth in claim 7 wherein said flange portion defines a cavity into which said discharge valve is movable.

9. An improved discharge valve assembly as set forth in claim 8 wherein said biasing means further include spring means positioned within said cavity and biasing said discharge valve into said closed position.

10. An improved discharge valve assembly for a compressor having means defining a compression chamber, said discharge valve assembly overlying said chamber and comprising:

a valve plate assembly having a surface facing said chamber and means defining a conical discharge passage including a portion defining a discharge valve seat;

a discharge valve positioned within said discharge passage and movable between open and closed positions within said passage;

valve guide means overlying and extending into overlapping spaced relationship with respect to said cylindrical portion of said discharge valve, said valve guide means including stop means overlying said discharge valve and operative to limit opening movement of said discharge valve whereby said discharge valve restricts flow through said discharge passage when in an open position, said discharge valve having a generally planar inner surface facing said chamber and positioned in substantially coplanar relationship with said valve plate surface when said discharge valve is in a closed position and including a conical peripheral surface portion generally complimentary in shape to and sealingly engageable with said valve seat to effectively close said discharge passage when said valve is in a closed position and an arcuate peripheral surface, portion adjoining said conical portion and extending radially inwardly away from said valve seat to said inner surface, said arcuate surface portion being spaced from said valve seat when said valve is in a closed position, whereby the restriction to flow through said discharge passage resulting from the limited opening movement of said discharge valve is reduced and the minimum flow area through said discharge passage when said valve member is in a fully open position is increased;

biasing means positioned between said guide means and said valve member for biasing said conical peripheral surface portion into engagement with said valve seat; and said valve guide means being spaced from said conically shaped sidewall so as to provide a flowpath for said discharge gas therebetween and including means defining a continuous annular surface positioned in opposed surrounding relationship to and engageable with said generally cylindrical peripheral portion of said discharge valve and said biasing means whereby said guide means operates to maintain said biasing means and said valve member in substantially coaxial aligned relationship with each other and with said discharge gas passage and to guide movement of said discharge valve between open and closed positions.

* * * * *

UNITED STATES PATENT AND TRADEMARK OFFICE
CERTIFICATE OF CORRECTION

PATENT NO. : 4,543,989
DATED : October 1, 1985
INVENTOR(S) : E. William Lorson

It is certified that error appears in the above-identified patent and that said Letters Patent is hereby corrected as shown below:

The following prior art references were omitted from the patent:

| | | |
|---|---|---|
| 3,999,898 | 12/28/76 | Chomczyk |
| 4,032,266 | 6/28/77 | Roeder |
| 4,049,017 | 9/20/77 | Jones |
| 4,060,098 | 11/29/77 | Bares et al |
| 3,898,999 | 8/2/75 | Haller |
| 3,944,381 | 3/16/76 | Dirk |

Signed and Sealed this

Fourth Day of February 1986

[SEAL]

*Attest:*

DONALD J. QUIGG

*Attesting Officer*

*Commissioner of Patents and Trademarks*